United States Patent [19]

Gavin

[11] Patent Number: 5,626,346

[45] Date of Patent: May 6, 1997

[54] EMBEDDED IN CONCRETE, ELASTOMERIC SEAL FOR PIPES

[76] Inventor: Norman W. Gavin, 2545 Ridge Rd., North Haven, Conn. 06473

[21] Appl. No.: 491,770

[22] Filed: Jun. 19, 1995

Related U.S. Application Data

[63] Continuation-in-part of Ser. No. 412,673, Mar. 29, 1995.

[51] Int. Cl.$^6$ .................................................. F16J 15/10
[52] U.S. Cl. ................ 277/9.5; 277/207 A; 277/DIG. 10
[58] Field of Search ................................. 277/9, 9.5, 186, 277/207 A, 212 FB, DIG. 10

[56] References Cited

U.S. PATENT DOCUMENTS

| | | | |
|---|---|---|---|
| 2,635,907 | 4/1953 | Heimbuch | 277/227 |
| 3,363,912 | 1/1968 | Holloway | 277/207 A |
| 3,493,237 | 2/1970 | Kleindienst | 277/207 A |
| 3,787,061 | 1/1974 | Yoakum | 277/164 |
| 3,813,107 | 5/1974 | Ditcher | 277/189 |
| 3,870,186 | 3/1975 | Reinhard | 277/207 A |
| 4,103,901 | 8/1978 | Ditcher | 277/9.5 |
| 4,227,700 | 10/1980 | Merry | 277/186 |
| 4,333,662 | 6/1982 | Jones | 277/207 A |
| 4,342,462 | 8/1982 | Carlesimo | 277/101 |
| 4,350,351 | 9/1982 | Martin | 277/207 A |
| 4,805,920 | 2/1989 | Gavin | 277/207 A |
| 4,809,994 | 3/1989 | Skinner et al. | 277/207 A |
| 4,951,914 | 8/1990 | Meyers et al. | 249/11 |
| 4,991,858 | 2/1991 | Abila et al. | 277/207 A |
| 5,048,648 | 9/1991 | Le Deit | 277/212 FB |
| 5,286,040 | 2/1994 | Nagquin | 277/207 A |
| 5,288,087 | 2/1994 | Bertoldo | 277/207 A |

FOREIGN PATENT DOCUMENTS

| | | | |
|---|---|---|---|
| 402783 | 8/1967 | Australia | 277/207 R |

Primary Examiner—William A. Cuchlinski, Jr.
Assistant Examiner—John L. Beres
Attorney, Agent, or Firm—Robert A. Seemann

[57] ABSTRACT

A cylindrical housing anchored in the opening of a concrete wall has a first cylindrical wall of generally uniform diameter attached to the inner side of the cylindrical housing and extending axially into the housing, a second generally radial annular wall has a radially outward side attached to the first wall and seals against a pipe through the cylindrical housing.

6 Claims, 8 Drawing Sheets

EMBEDDED IN CONCRETE, ELASTOMERIC SEAL FOR PIPES

This application is a continuation-in-part of application Ser. No. 08/412,673, filed Mar. 29, 1995 pending.

BACKGROUND OF THE INVENTION

1. Field of the Invention

This invention relates to water tight sealing between the concrete walls of septic tanks and like subterranean concrete vessels, and pipes Which pass through the walls for carrying effluent therethrough. More specifically it relates to the design of a seal which is embedded in the concrete wall during casting of the concrete wall, that seals against any one of a variety of septic pipes that are used in the trade, including straight walled, corrugated, and schedule 40 pipe and which reversibly fastens the seal in the mold of the concrete wall during casting of the wall.

2. Description of the Prior Art

U.S. Pat. No. 4,103,901, patented Aug. 1, 1978, by J. Ditcher, describes an assembly which is described here as seen in cross section, in order, from the periphery toward the center of an annulus of flexible elastomeric material. It is a radially oriented T with a bulbous bottom end, followed by a first oblique leg extending beyond one side of center line, followed by a reverse angled second oblique leg which crosses back to the other side of center line, ending in a bulbous termination. The bulbous termination is an O-ring which grips the pipe that is inserted through the seal. The T with bulbous bottom end is fully embedded in the concrete. Because the O-ring has little latitude for expansion and may resist insertion of the pipe, a temporary lubricated nose cone of frustoconical shape is sometimes placed on the pipe before it is inserted through the O-ring. If the pipe is smaller than the O-ring, a stainless steel tension band may be placed over the second oblique leg to clamp it around the pipe.

The ring is cast into the concrete wall peripheral to the opening through the wall to a depth in which the wall encloses the T and bulbous bottom end. For the casting procedure, the assembly is sandwiched between the smaller diameter ends of two frustoconical mold rings. The mold rings are held together on the assembly by an axially oriented slotted bracket that extends from a first spanning strap on one ring, and passes through the O-ring and through a slot in a second spanning strap on the other mold ring. The bracket is pinned in the second strap by a cross pin or key through the slot in the bracket.

U.S. Pat. No. 4,333,662, patented Jun. 8, 1982 by W. D. Jones, describes an annulus of flexible elastomeric material which is described here as seen in cross section, taken in the direction from a hollow ring in sealing contact with the pipe, toward the outer radial periphery of the seal assembly. It is the hollow ring, a short radial connector leg, attached to a pyramidal base with surfaces that diverge at a dihedral angle of about 140 degrees relative to one another. The diverging elastomeric surfaces protect the pipe from being damaged by the concrete surface of the opening. The lower portion of the base is cast into the concrete which forms the opening through the wall. Additional legs extend, one from each side of the base, and cover the remaining concrete on the inward facing surface of the opening through the wall. Each leg then folds back inward in a V, where the outer leg of the V is also cast in the concrete.

The seal is held during casting, by a pair of disks which sandwich the hollow ring between them, their shoulders resting against the diverging elastomeric surfaces and the legs. The disks are drawn together in parallel relationship by a pattern of axial bolts through them.

U.S. Pat. No. 5,286,040, patented Feb. 15, 1994 by N. W. Gavin, describes an annulus of flexible elastomeric material comprising an outer cylindrical wall that fits within the opening in the concrete housing and has a radially outward extending element embedded in the concrete during the casting of the concrete housing. The outer cylindrical wall further has an inward depending, frustoconical wall. The smaller diameter end of the frustoconical wall seals against the pipe. A diaphragm attached to the annular edge of the smaller diameter end and sealing, over the smaller diameter end has different diameter tear out rings so that various size openings can be made at the smaller diameter end to seal around various diameter pipes. In casting the seal in the concrete wall of the housing, the seal is mounted by the frustoconical wall of the seal, on a frustoconical plug which is mounted on a movable portion of the wall of the mold. Axially extending pins on the diaphragm engage the smaller diameter face of the frustoconical plug and align the seal about the axis of the cylindrical wall in a preferred rotational position.

U.S. Pat. No. 4,951,914, patented Aug. 28, 1990 by Meyers et al., describes an annulus of flexible elastomeric material comprising an outer cylindrical wall that fits within an opening in a wall of a concrete housing and has a radially outward extending element embedded in the concrete during the casting of the concrete wall of the housing. The outer cylindrical wall has an inward depending, frustoconical wiper attached by the larger diameter end to one end of the cylindrical wall. The smaller diameter end of the frustoconical wiper extends into the cylinder and seals against the pipe.

In casting the seal in the wall, a frustoconical plastic mandrel bolted on a swing out portion of the mold wall seats in the frustoconical wiper of the seal. The mandrel has, at the radially outward edge of the smaller diameter end, a gripper portion which releasibly frictionally retains the free end of the frustoconical wiper wall from one side during casting of the seal assembly in the concrete wall of the housing. An annular knock out plug or plate, rests against the smaller diameter end of the mandrel within the confines of the outer cylindrical wall in order to prevent entry of liquid concrete into the space between the outer cylindrical wall and the frustoconical wiper.

SUMMARY OF THE INVENTION

It is one object of the invention to provide an embedded in concrete pipe seal for septic systems that provides a watertight seal against the outer surface of a pipe of uniform diameter.

It is another object of the invention that the embedded in concrete pipe seal provides a watertight seal against the outer surface of a corrugated pipe.

It is another object that the seal prevents leakage of water from within the subterranean concrete vessel to the surrounding earth.

It is another object that the seal prevents leakage of water water from surrounding earth into the subterranean concrete vessel.

It is another object that the seal protects the pipe against damage from the concrete of the opening through which the pipe passes.

It is another object that the seal can support the weight of the buried pipe without damage to the seal body or leakage.

It is yet another object of the invention that sealing between the vessel and the pipe remains effective if the angle between the pipe and vessel changes after installation due to characteristic settling of the septic system concrete vessel and piping.

It is still another object that sealing assembly of the pipe in the concrete vessel wall opening can be done easily, without special tools, aids or need for special skill or dexterity. It is yet another object of the invention that the seal is easy to position and hold for casting in place in the concrete.

It is another object that the seal includes reversible fastening means for fastening the seal on a holding fixture for casting the seal in the concrete.

It is another object that the reversible fastening means is on a wall of the seal that is radially inward of a pipe seal interface of the seal.

It is another object that the reversible fastening means is a part of the seal that is spaced from a pipe seal interface of the seal.

It is another object that the reversible fastening means is on a generally planar wall that is generally normal to the axis of a cylindrical wall.

It is another object that the reversible fastening means is removed from the seal by removal of a portion of a wall which is adjustable to provide different predetermined pipe seal interface sizes.

Other objects and advantages will become apparent to one reading the ensuing description of the invention.

An elastomeric seal for sealing a pipe through a concrete wall includes a cylindrical housing having a central axis and anchor means adapted for being cast in the concrete wall so that there is a water tight seal between the concrete wall and the cylindrical housing.

A first cylindrical wall being of generally uniform diameter, and concentric with the central axis, is attached at one end to the inner side of the cylindrical housing, and has the other end extending axially into the cylindrical housing.

A second generally radial annular wall has a radially outward side attached to the first end of the first wall, is generally normal to the first wall, and comprises means for sealing against a pipe inserted through the cylindrical housing.

The housing and the first cylindrical wall comprise a cylindrical slot between them generally concentric with the first wall.

The second wall comprises, radially inward of the first wall, reversible fastening means for reversibly fastening the elastomeric seal to a mold of a concrete wall for a vessel, the reversible fastening means comprising an axial pin having a snap protrusion adapted for engaging an opening on the mold.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
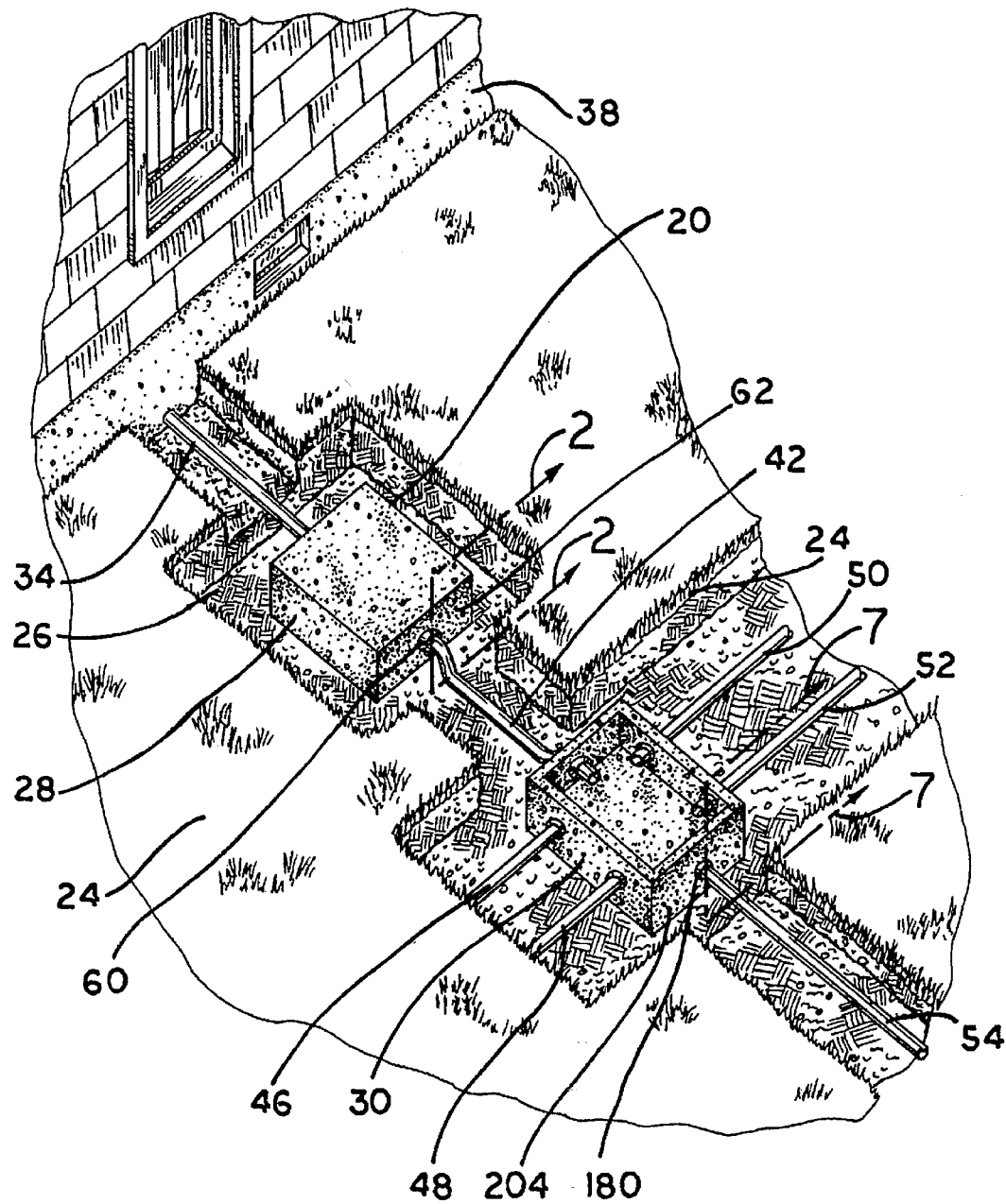
FIG. 1 is a fragmentary perspective view of an underground septic tank system having the present invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In FIG. 1, septic tank system 20 is installed and buried below ground 24 in installation pit 26. The system includes two concrete vessels, septic tank 28, and distribution box 30.

Plastic pipe 34 carries waste from house 38 to vessel 28 where it is digested. Liquid for distribution to the septic fields (not shown) by the distribution box rises to the top of vessel 28, and is delivered to vessel 30 by way of pipe 42. The liquid is then distributed to the septic fields by vessel 30 by way of pipes 46, 48, 50, 52, and 54. Pipe 42 is connected to vessel 28 by way of cast in concrete seal 60 in concrete wall 62 of vessel 28.

Pipe 42 is supported by the earth upon which it rests at the bottom of installation pit 26, and by seal 60. Seal 60 is subjected to great stress from misalignment of the pipe, settling of the earth which also supports the vessels, and backfill, the dumping of earth back into the pit in order to bury the septic tank system.

Figure 2:
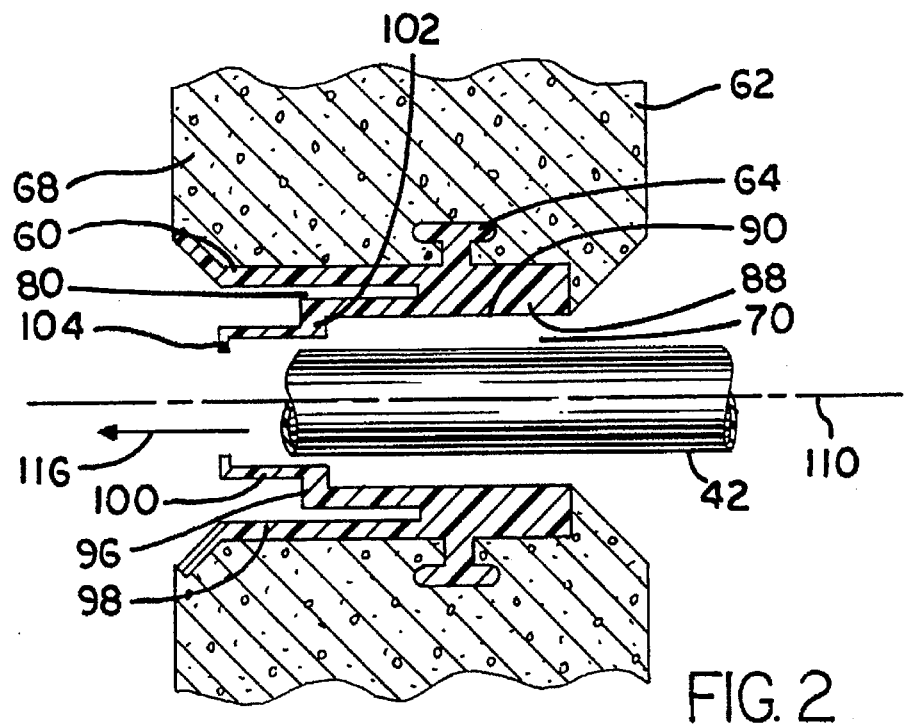
FIG. 2 is a cross section view taken at 2—2 of FIG. 1, of a portion of the concrete septic tank of the septic tank system, incorporating the present invention cast in concrete pipe seal.

Referring now to FIG. 2 and a preferred construction of a cast in concrete seal according to the invention, molded flexible elastomeric seal 60 is anchored by annular flange 64 into the concrete 68 surrounding opening 70 through wall 62. Seal 60 is cast into the wall, and is part of the mold which defines opening 70, as will be explained later.

A water tight seal between seal 60 and concrete 68 is established by intimate contact of the concrete with wall 88 and with annular flange 64.

Cylindrical slot 80 is located preferably within cylindrical wall 88 so that inward facing side 90 of wall 88 is straight and of uniform diameter. Cylindrical walls 96, 98, and 100 are concentric with each other and axis 110 of wall 88.

Radial walls 102 and 104 each are generally normal (90 degrees) to axis 110.

Seal 60 receives pipe 42 from outside the vessel by insertion in direction 116.

Figure 3:
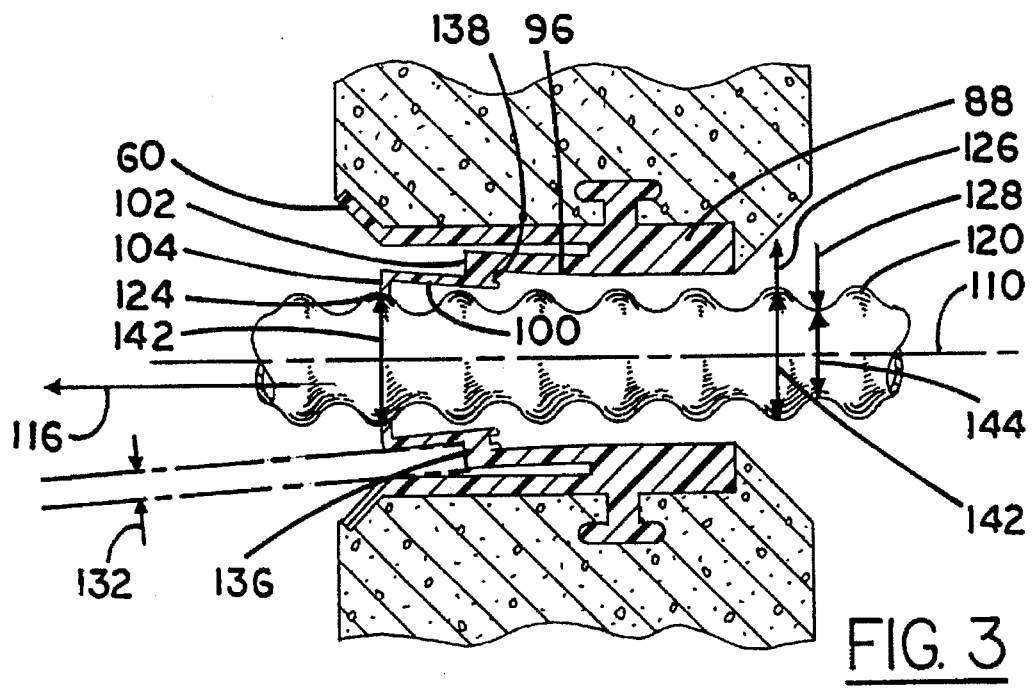
FIG. 3 is a cross section view of the seal of FIG. 2 receiving corrugated septic system pipe.
Figure 4:
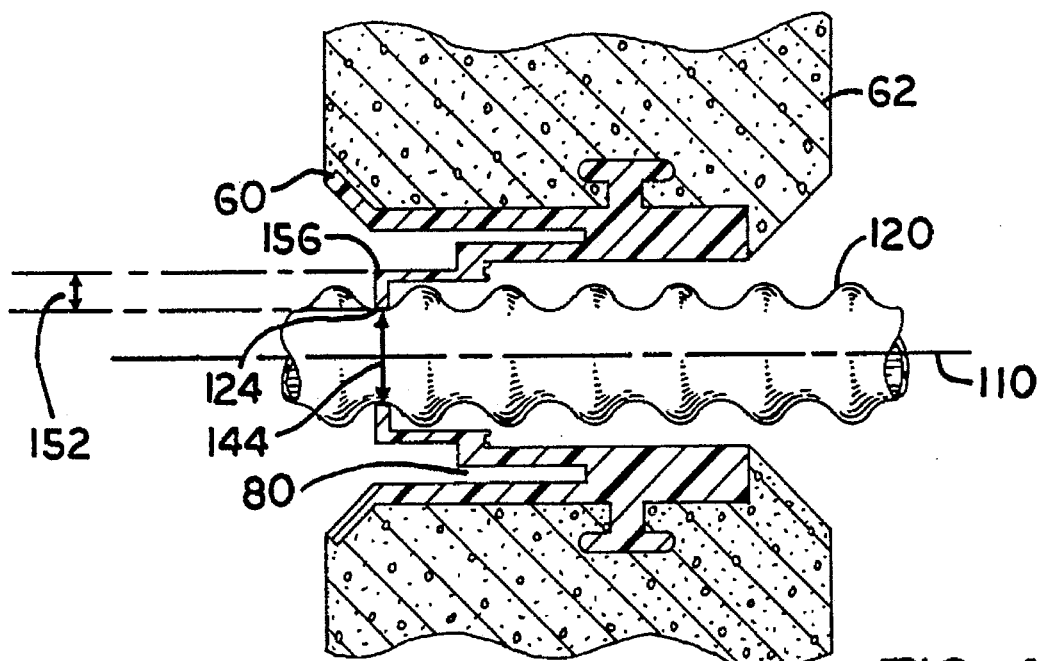
FIG. 4 is a cross section view of the seal of FIG. 2 holding corrugated septic system pipe.

Referring to FIGS. 3 and 4, corrugated pipe 120 is inserted in seal 60 in direction 116. An inserted pipe applies radially outward biasing force 126 via annular interface 124 between the seal and the pipe, to the seal walls which cooperate to resist the outward biasing force and provide radially inward sealing force 128 via interface 124 against the pipe. Walls 96, 102, 100, and 104 respond in different, interrelated ways.

Wall 96 having a long fulcrum arm and a relatively small radial thickness, contributes a moderate sealing pressure. Having a relatively long length compared to the radial thickness of cylindrical slot 80, wall 96 arcs outward readily, yet remains generally parallel to cylindrical wall 88. The ratio of length to thickness of slot 80 is greater than unity, preferably greater than 5 to 1.

Wall 102, having a radial thickness equal to radial height 132, has high resistance to diametric expansion. It expands normal to axis 110, contributing a first level of high sealing force, until slot 80 is closed, whereupon wall 102 provides a higher level of sealing force. Wall 102 can also crush, and rotate slightly about annular connecting joint 136.

Figure 6:
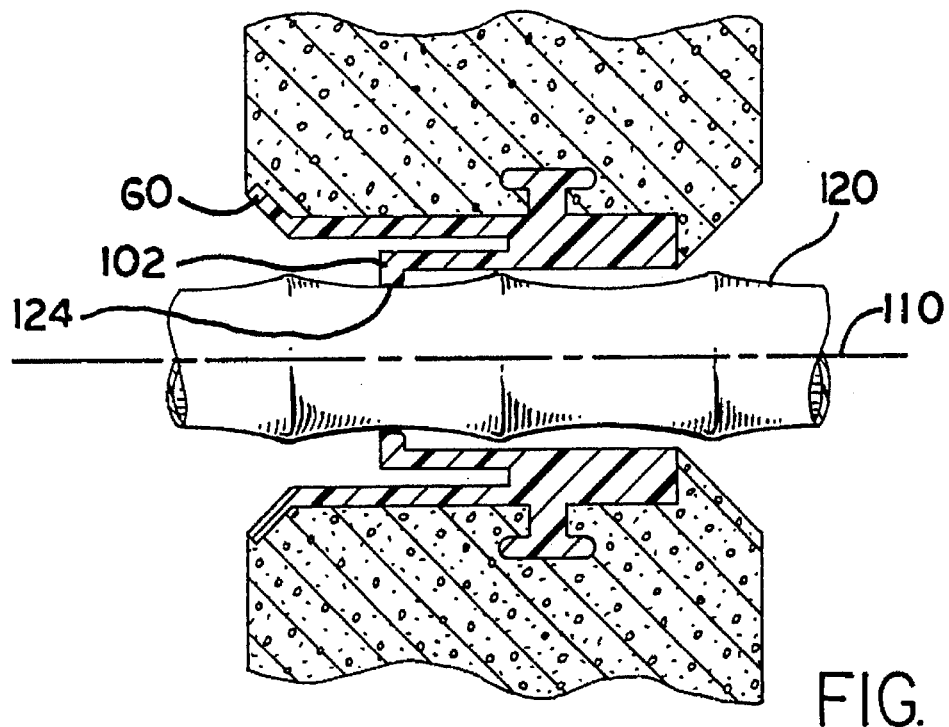
FIG. 6 is a cross section view of another cast in concrete seal of the present invention, holding schedule 40 pipe.

Wall 102 can operate as an annular interface 124, as shown in FIG. 6. This is done by inserting a screw driver in weakened annular separation ring 138 and prying away elements of the seal radially inward of ring 138. The seal may include concentric or asymmetrical annular separation rings. Details of the rings and how they work are described in U.S. Pat. No. 5,286,040 by Gavin. U.S. Pat. No. 5,286,040 is hereby incorporated by reference.

Wall 100 arcs outward, having a lower radial thickness than wall 102 or 104, provides a moderate sealing force, and provides room for diametric expansion of wall 104.

Wall 104 is shown in FIGS. 3 and 4, operating as an annular interface 124. It is shown operating as an annular interface 124 on a major diameter 142, and on a minor diameter 144.

Having a radial thickness equal to radial height 152, wall 104 has high resistance to diametric expansion. It expands normal to axis 110, contributing a high sealing force. Wall 104 can also crush, and rotate slightly about annular connecting joint 156.

Figure 5:
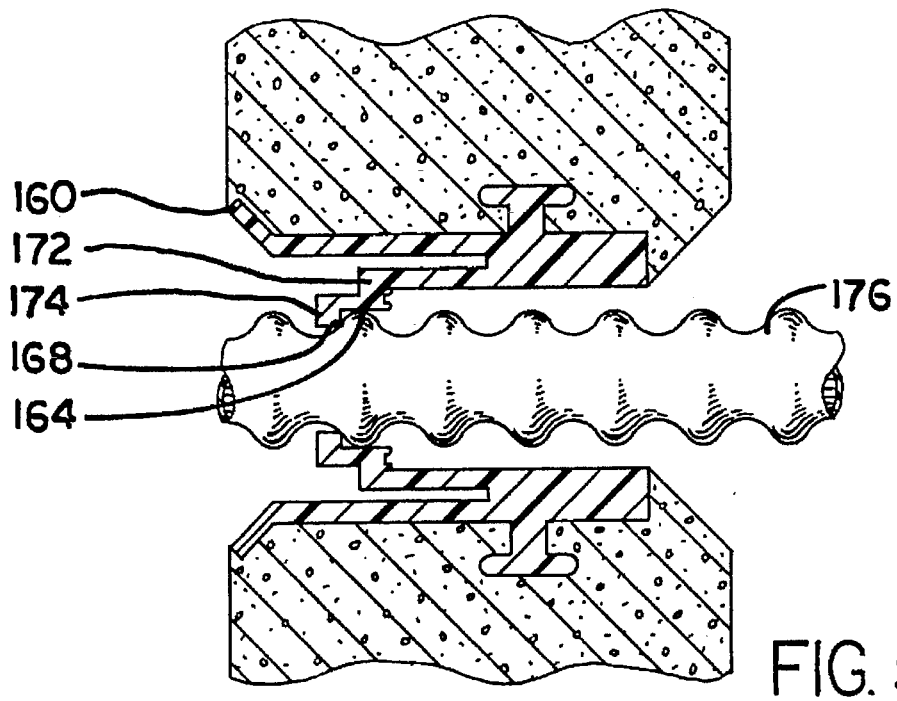
FIG. 5 is a cross section view of another cast in concrete seal of the present invention.

Cast in concrete seal 160 in FIG. 5 has annular interfaces 164 and 168 provided by radial walls 172 and 174 respectively, which apply a higher total sealing force on pipe 176.

Figure 7:
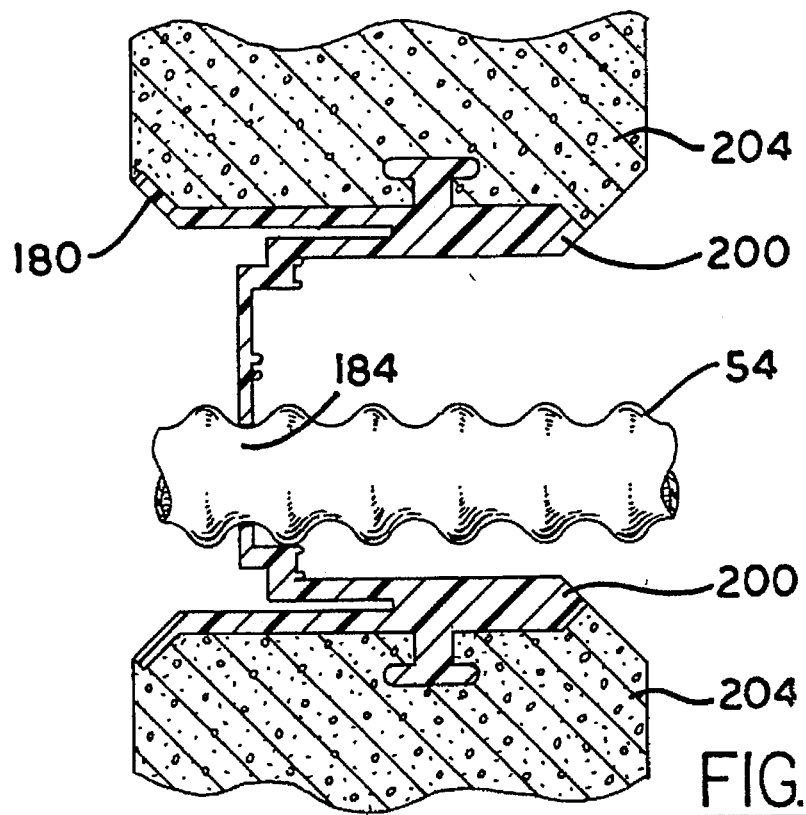
FIG. 7 is a cross section view taken at 7—7 of FIG. 1, of a portion of the concrete distribution box of the septic tank system, incorporating the present invention cast in concrete pipe seal.
Figure 9:
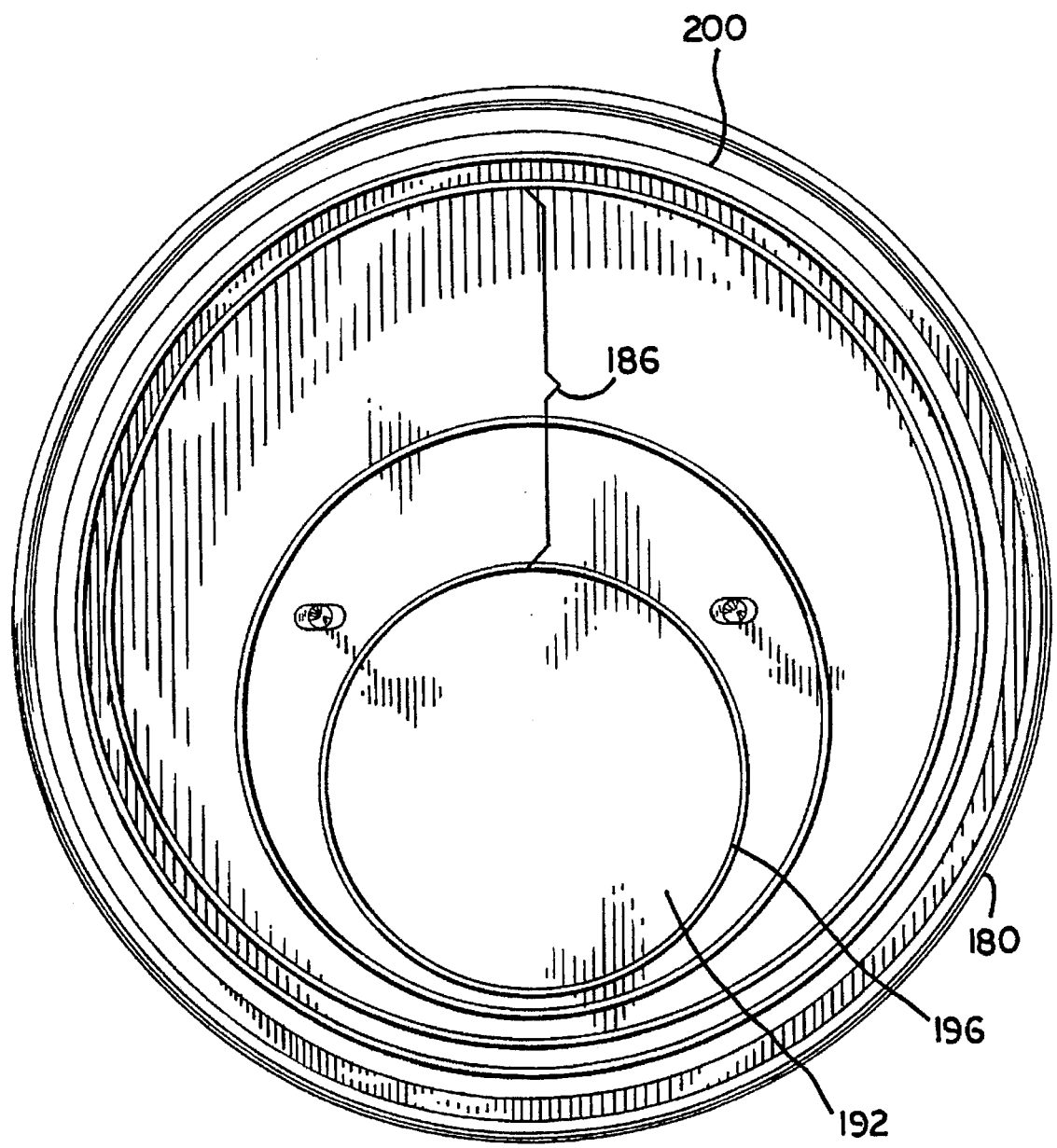
FIG. 9 is a front view of the seal of FIG. 8.

Referring to FIGS. 1, 7, and 9, cast in concrete seal 180 holds pipe 54 in asymmetrical opening 184 through the seal, of radial wall 186. The asymmetrical opening was provided by removing section 192 of the seal within weakened annular separation ring 196. Locating the pipe closer to cylindrical wall 200 which is directly supported by the concrete wall 204 provides better support for the pipe and better drainage from the distribution box.

Figure 8:
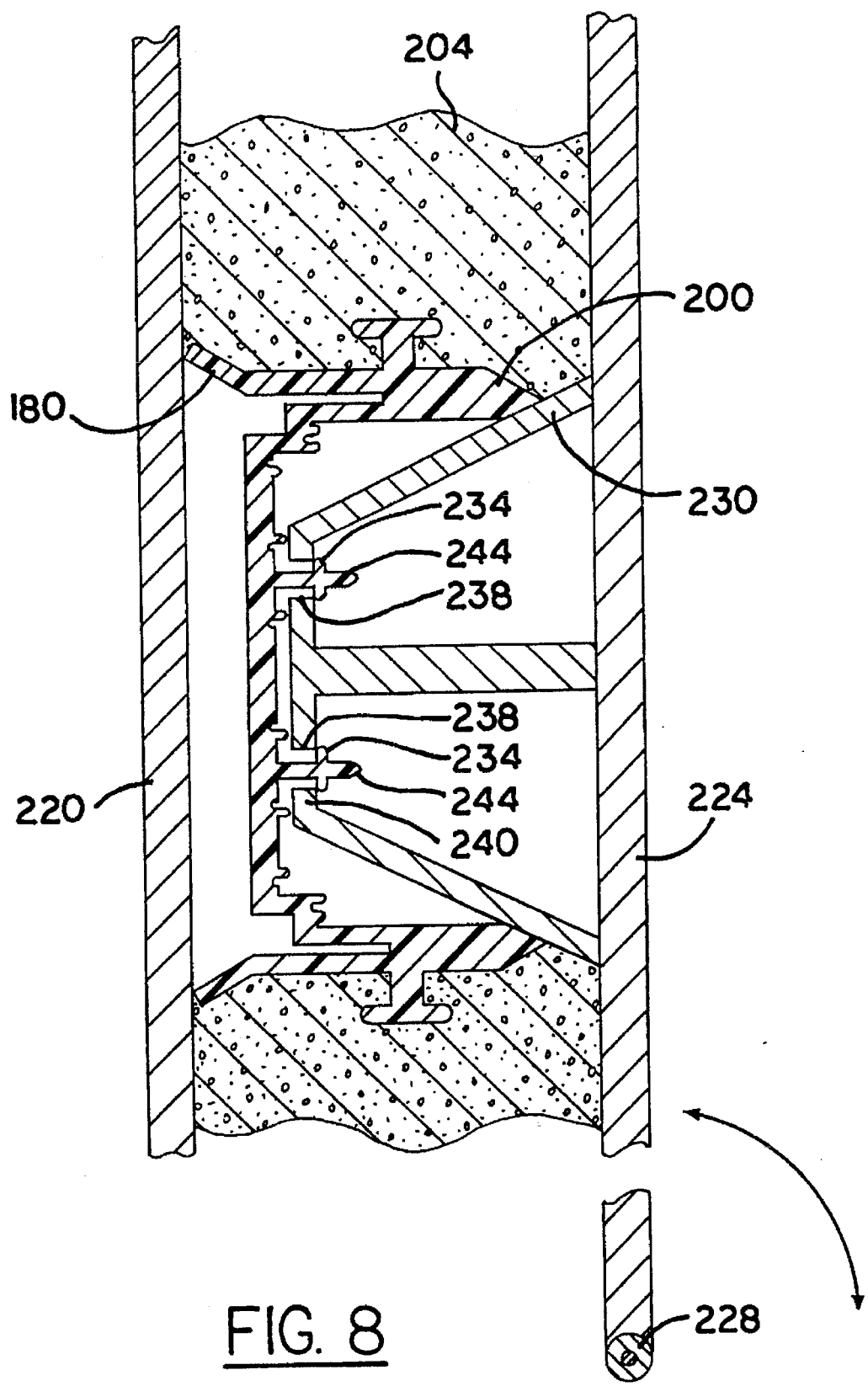
FIG. 8 is a cross section view of a seal of the present invention, held in the mold for casting the vessel wall with the opening through the wall and the seal in the opening, integral with the wall.

In FIG. 8, seal 180 is in a mold for casting the seal with the wall. Steel plate 220 defines the inner facing side of wall 204. Steel plate 224 defines the outward facing side of wall 204, and pivots outward on bearing 228. A similar arrangement for the plates is seen in U.S. Pat. 5,286,040.

Support core 230 is designed to hold the present invention seal for positioning it between the steel plates. As axial lengths of the cylindrical walls and radial heights of the radial walls may vary between various models of the seal of the present invention, support core 230 must be able to hold the seal in a consistent manner from seal to seal. For this purpose, a reversible fastening means is provided on an radial wall that is normal to the axis of the seal, spaced inward from the axial walls of the seal.

Reversible fastener snap protrusion 234 holds the seal on core 230 by engaging holes 238 on radial wall 240 of the core. Preferably the reversible fastening means is combined with an orienting means such as pin 244 to position asymmetrical sections of the seal as desired with respect to the bottom of the concrete wall.

Figure 10:
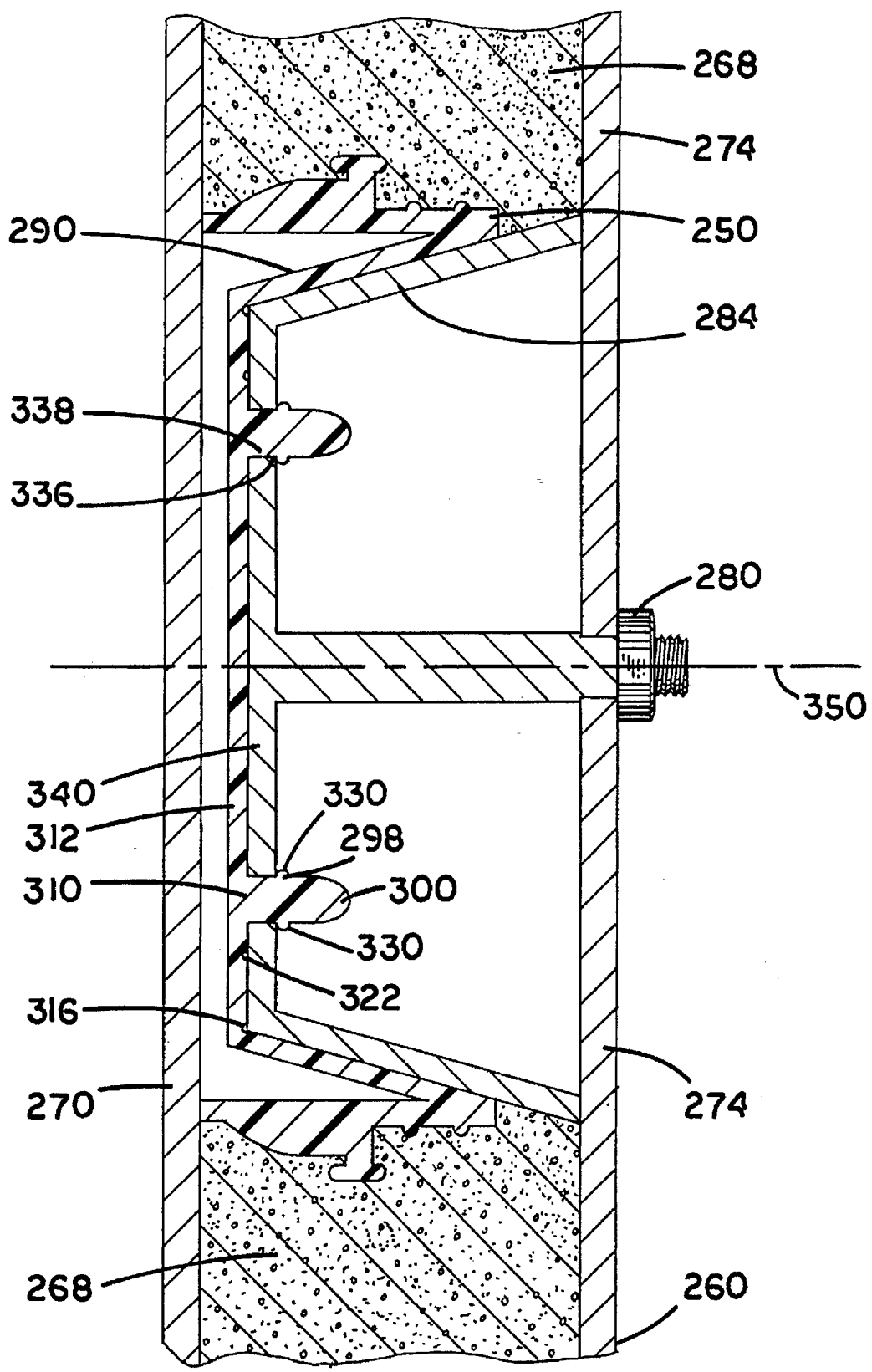
FIG. 10 is a cross section view of another seal of the present invention, held in the mold for casting a concrete vessel wall with the opening through the wall and the seal in the opening, integral with the wall.

In FIG. 10, seal 250 is in a mold 260 for casting the seal with concrete wall 268 of a vessel. Steel plate 270 defines the inward facing side of the vessel of wall 268. Steel plate 274 defines the outward facing side of wall 268. Steel plate 268 can be moved outward from the vessel mold.

Bolted 280 to plate 274 is support core 284 which closely fits frustoconical wall 290 of seal 250.

Reversible fastening means 298 is on wall 312, and is spaced radially inwardly from weakened annular separation ring 322. When section 310 of wall 312 within the confine of annular separation ring 322 is separated from the seal at annular separation ring 322, reversible fastening means 298 is removed from the seal by the removal of section 310.

Weakened annular separation ring 316 is the annular pipe seal interface closest to the small diameter end of frustoconical wall 290. It defines the largest annular pipe seal interface provided by removing a section of wall 312. Annular separation ring may be at the junction of walls 312 and 290. Removing wall 312 at separation ring 316 also removes reversible fastening means 298 from the seal.

In preparing seal 250 for casting with and in wall 268, seal 250 is slipped on support core 284 and pressed down on the core until reversible fastening means 298 fastens the seal on the support core.

Protrusions 330 on pin 300, engaging edge 336 of opening 338 wall 340 of core 284 provide secure reversible fastening of the seal on the core. If desired, the pin can be tapered or otherwise contoured to provide a friction fit between the pin and core to provide reversible fastening between the seal and core.

It is convenient to combine the reversible fastening means with a guide pin 300 integral with the seal so that rotational alignment about axis 350 of seal wall 290 is provided by pin 300.

Figure 11:
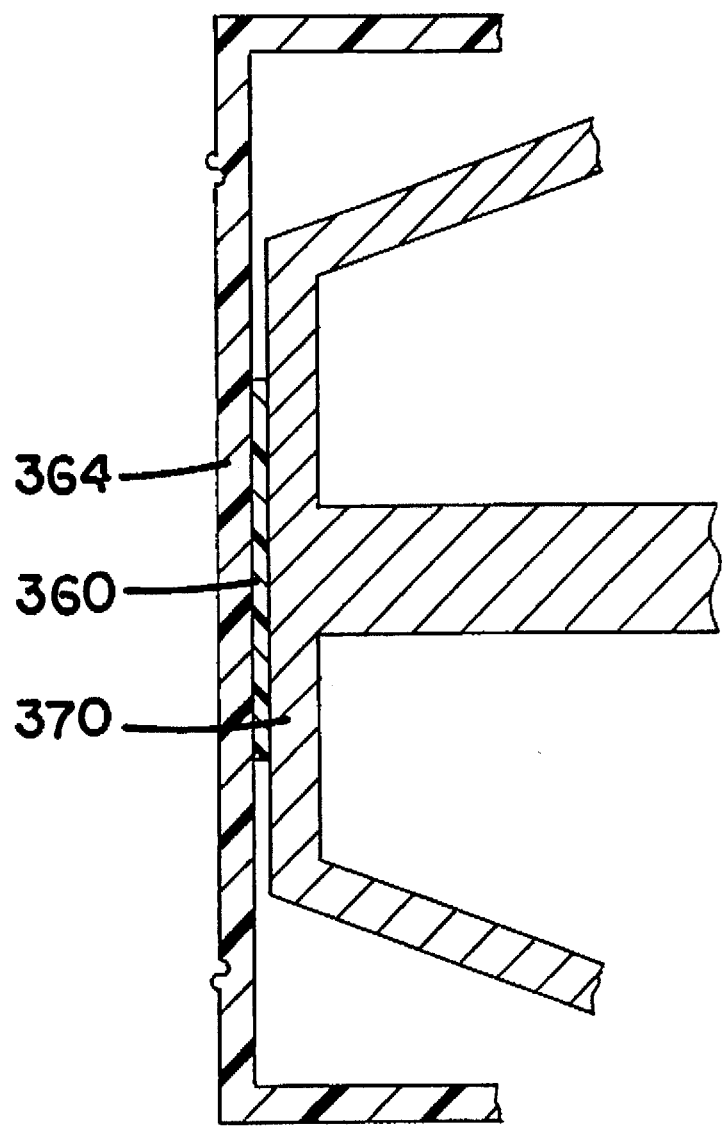
FIG. 11 is a partial cross section view of a seal removably fastened on a mold core.

Other reversible fastening means may be used on the radial wall, for example in FIG. 11, two sided adhesive tape 360 between seal wall 364 and support core wall 370 removably fastens them together.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A molded elastomeric seal adapted for casting in a concrete wall, for sealingly receiving
   a pipe through a concrete wall of a subterranean vessel, said seal comprising:
   a cylindrical housing having a central axis, a first end, a second end, an inner side and an outer side,
   anchor means comprising said outer side of said cylindrical housing, adapted for being cast in said concrete wall so there is a watertight seal between said concrete wall and said cylindrical housing,
   a first, frustoconical wall around said axis, having a first end, a second end, and being attached to said cylindrical housing, a second, generally radial wall attached to said first frustoconical wall in a watertight seal of said first frustoconical wall, said second wall being generally planar, normal to said axis, and comprising means for sealing around a pipe of a predetermined diameter when said pipe is inserted through said cylindrical housing, said means for sealing around a pipe comprising an annular separation ring, temporary fastening means mounted on said second wall so that the fastening means prevents axial withdrawal of said seal from the core of a mold for casting the molded elastomeric seal in the concrete wall and permits withdrawal of said seal from said core for mounting of another seal on said core for casting, said temporary fastening means being spaced radially inward from said annular separation ring.

2. The seal of claim 1, further comprising:

said means for sealing around a pipe being adjustable for sealing around one of a plurality of predetermined pipe sizes by removal of a section of said second wall containing said temporary fastening means.

3. The seal of claim 1, further comprising:

an axial pin mounted on said second wall so that said pin engages the core for orienting the seal on the core, said temporary fastening means comprising a radial protrusion on said pin for preventing axial removal of the seal from the core.

4. A molded elastomeric seal adapted for casting in a concrete wall, for sealingly receiving a pipe through a concrete wall of a subterranean vessel, said seal comprising:

a cylindrical housing having a central axis, a first end, a second end, an inner side and an outer side, anchor means comprising said outer side of said cylindrical housing, adapted for being cast in said concrete wall so there is a watertight seal between said concrete wall and said cylindrical housing, a first, tubular wall around said axis, having a first end and being attached to said cylindrical housing, a second, generally radial wall attached to said elastomeric seal in a watertight seal of said first tubular wall, said second wall being generally planar, normal to said axis, and comprising means for sealing around a pipe of a predetermined diameter when said pipe is inserted through said cylindrical housing, said means for sealing around a pipe comprising an annular separation ring on said second wall, a core of a mold for casting the molded elastomeric seal in the concrete wall, temporary fastening means mounted on said second wall so that said temporary fastening means prevents axial withdrawal of said seal from said core for casting the molded elastomeric seal in the concrete wall and permits withdrawal of said seal from said core for mounting of another seal on said core for casting, said temporary fastening means being spaced radially inward from said annular separation ring.

5. The seal of claim 4, further comprising:

an axial pin mounted on said second wall so that said pin engages the core for orienting the seal on the core, said pin having said temporary fastening means on said pin, said temporary fastening means comprising a radial protrusion on said pin for engaging an opening in said core for preventing axial removal of said seal from said core.

6. An elastomeric seal adapted for casting in a concrete wall, for sealingly receiving a pipe through a concrete wall of a subterranean vessel, said seal comprising:

a cylindrical housing having a central axis, a first end, a second end, an inner side and an outer side, anchor means comprising said outer side of said cylindrical housing, adapted for being cast in said concrete wall so there is a watertight seal between said concrete wall and said cylindrical housing, a first, frustoconical wall around said axis, having a first end, a second end, and being attached to said cylindrical housing, a second, generally radial wall attached to said first frustoconical wall in a watertight seal of said first frustoconical wall, said second wall being generally planar, normal to said axis, and comprising means for sealing around a pipe of a predetermined diameter when said pipe is inserted through said cylindrical housing, said means for sealing around a pipe comprising an annular separation ring, a core of a mold for casting the molded elastomeric seal in the concrete wall, temporary fastening means mounted on said second wall so that said temporary fastening means prevents axial withdrawal of said seal from said core for casting the molded elastomeric seal in the concrete wall and permits withdrawal of said seal from said core for mounting of another seal on said core for casting, said temporary fastening means being spaced radially inward from said annular separation ring.

* * * * *